United States Patent [19]

Nagoya

[11] 4,348,833
[45] Sep. 14, 1982

[54] OPENING AND CLOSING A FLEXIBLE SCREEN IN A GREENHOUSE OR THE LIKE

[75] Inventor: Takato Nagoya, Oyama, Japan

[73] Assignee: Seiwa Kagaku Kabushiki Kaisha, Japan

[21] Appl. No.: 235,637

[22] Filed: Feb. 18, 1981

[51] Int. Cl.³ .............................................. A01G 9/14
[52] U.S. Cl. ............................................ 47/17; 52/66
[58] Field of Search .......................... 47/17; 52/66–67

[56] References Cited

U.S. PATENT DOCUMENTS

| 3,481,073 | 12/1969 | Yoshida et al. | 47/17 |
| 4,067,347 | 1/1978 | Lipinski | 47/17 X |

FOREIGN PATENT DOCUMENTS

| 96440 | 9/1963 | Denmark | 47/17 |
| 2339266 | 2/1975 | Fed. Rep. of Germany | 47/17 |
| 2416644 | 10/1979 | France | 47/17 |

Primary Examiner—Robert E. Bagwill
Attorney, Agent, or Firm—Steinberg & Raskin

[57] ABSTRACT

Apparatus for opening and closing the flexible screen of a greenhouse or the like include an elongated driving shaft rotatably mounted about a fixed axis of rotation, a prime mover such as a reversible motor for selectively rotating the driving shaft in either one of the normal and reverse directions, transmission gear apparatus operatively connected to the driving shaft, an elongated flexible driving shaft operatively connected at one end to the transmission gear apparatus adapted to be rotated through the transmission gear apparatus upon the rotation of the driving shaft, reduction gear apparatus operatively connected to the other end of the elongated flexible driving shaft and a winding rod operatively connected at one end to the reduction gear apparatus and adapted to be rotated through the reduction gear apparatus upon rotation of the flexible driving shaft. The reduction gear apparatus is mounted for movement with respect to the greenhouse according to the rotary motion of the winding rod and which prevents spontaneous rotation of the reduction gear apparatus.

10 Claims, 11 Drawing Figures

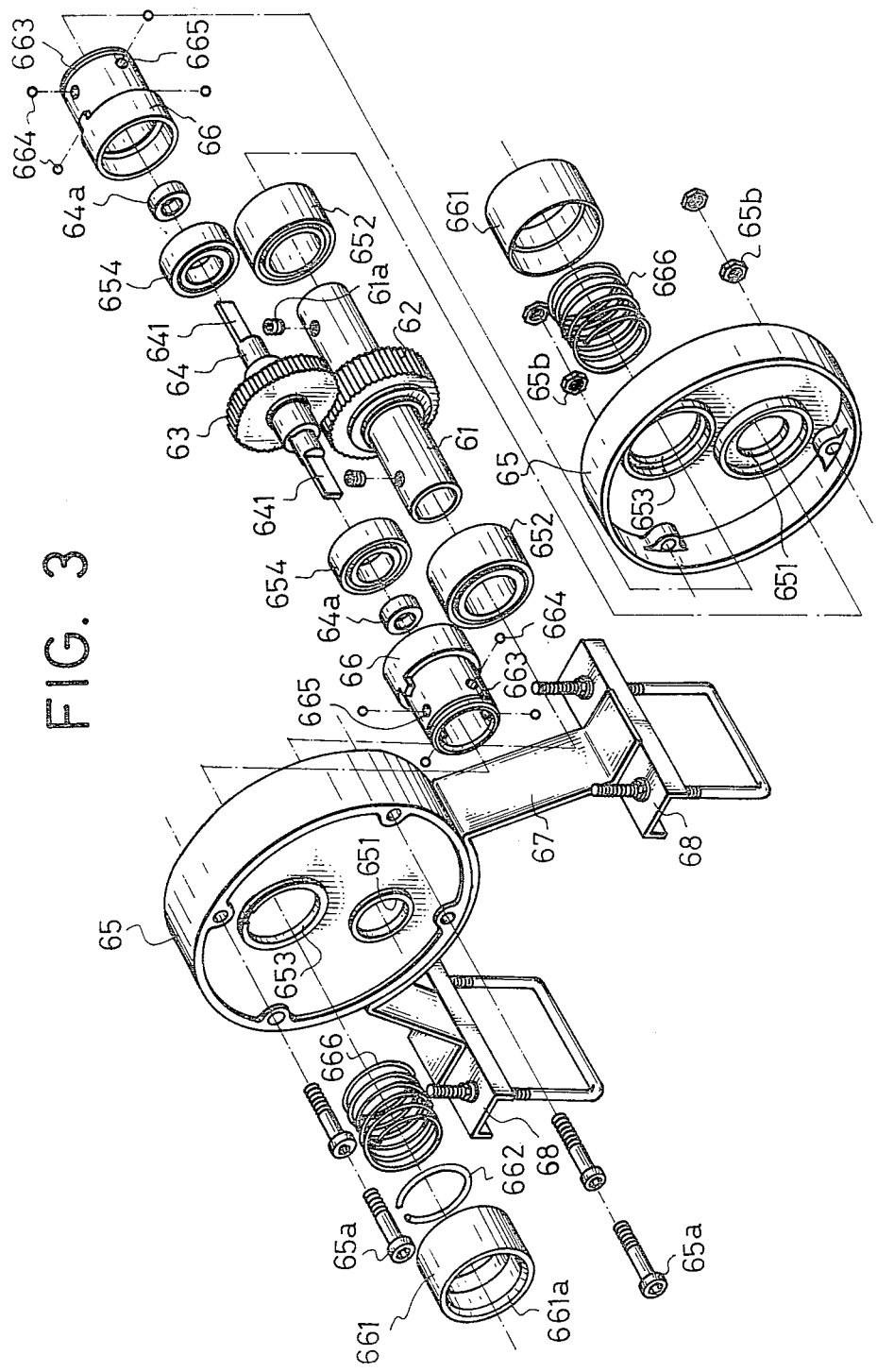

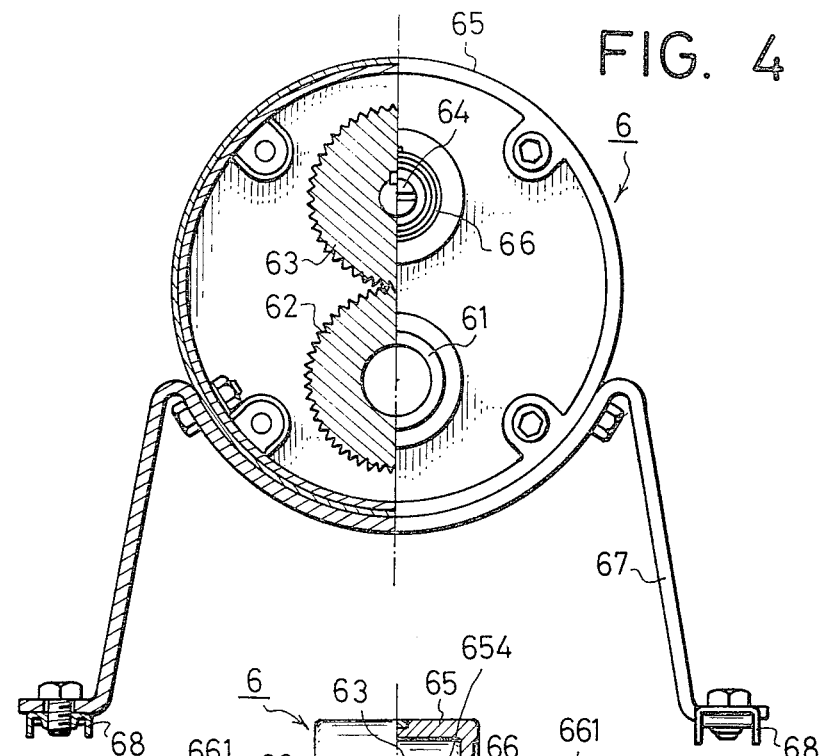
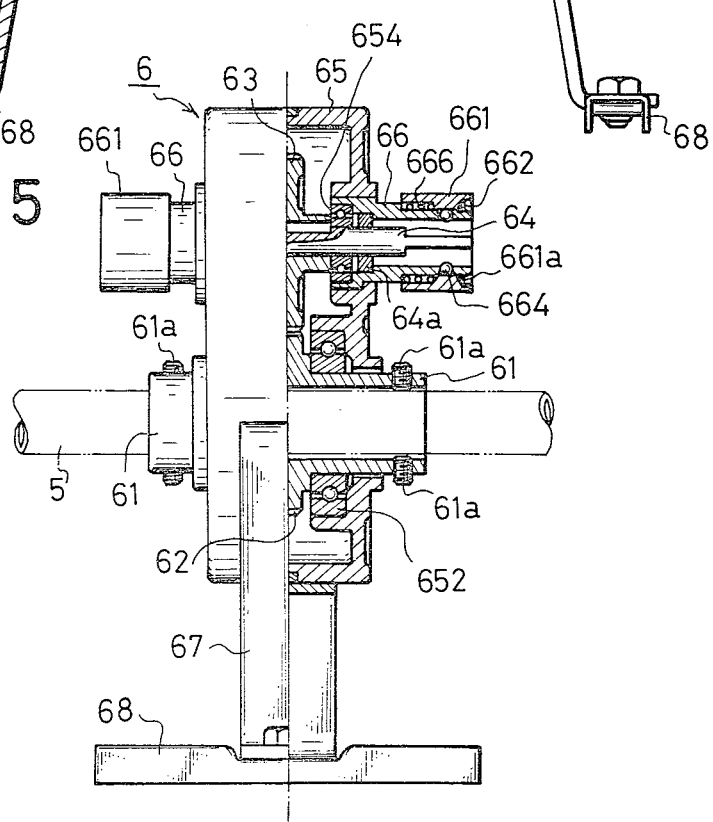

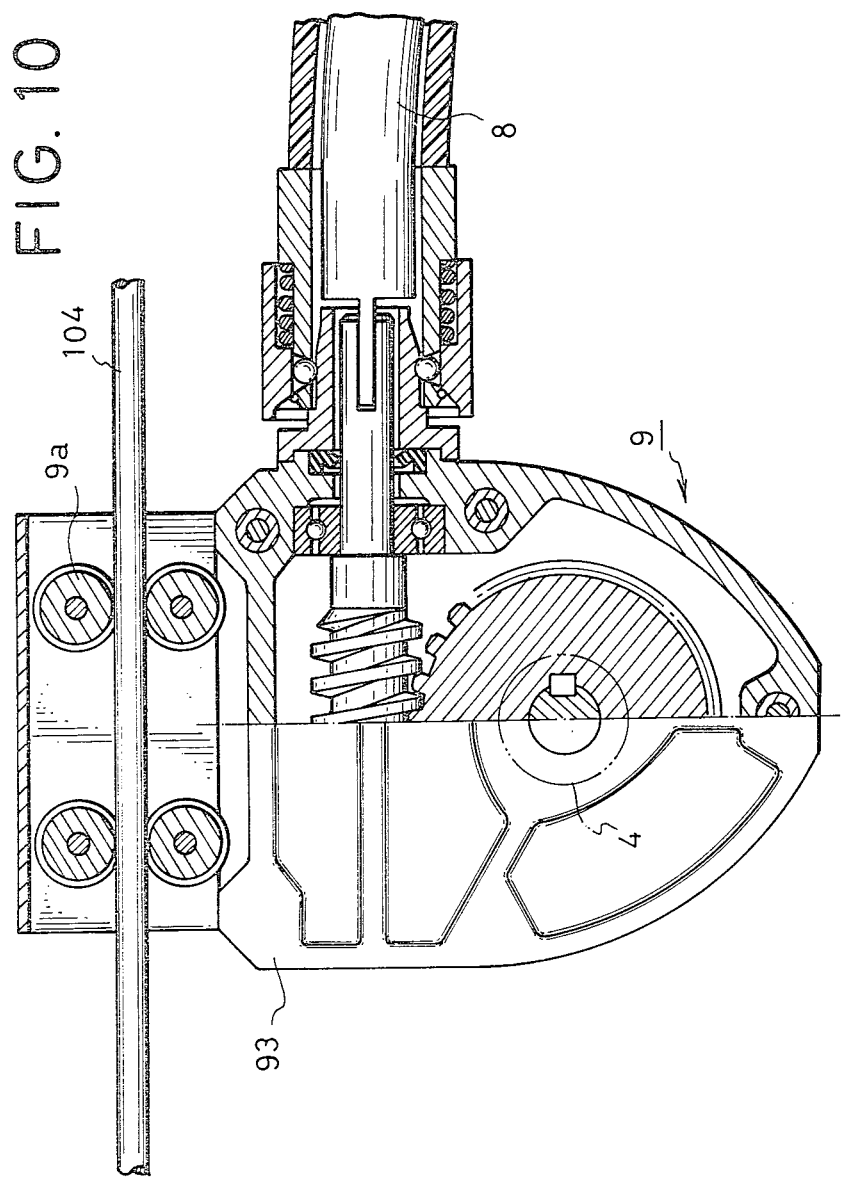

OPENING AND CLOSING A FLEXIBLE SCREEN IN A GREENHOUSE OR THE LIKE

BACKGROUND OF THE INVENTION

The present invention relates generally to apparatus for opening and closing a flexible screen of a greenhouse or the like and, more particularly, to apparatus for opening and closing a flexible screen which when closed maintains a controlled atmosphere in the greenhouse and when opened ventilates the same. The flexible sheet may comprise a plastic sheet which covers the outer surface of the greenhouse or a sheet material which partitions the interior of the greenhouse. The present invention relates to such apparatus wherein the winding rod winds the screen to open the same and unwind the screen to close the same.

Conventional apparatus of the type described above for opening and closing a flexible screen of a greenhouse are disclosed in Japanese published applications Nos. 24852/77 and 43638/77. Referring to FIGS. 1a and 1b which illustrate the conventional apparatus, a prime mover M is disposed on one end of a gable side in the trough portion defined between adjacent ceilings of a greenhouse of the multiple-ridge type. One end of a flexible driving shaft F is connected to the drive shaft S of the prime mover M while the other end of the flexible driving shaft F is connected to a pipe P for winding the screen A. The screen A is wound and unwound through the normal and reverse rotations of the prime mover M.

The conventional apparatus illustrated in FIGS. 1a and 1b are not entirely satisfactory. More particularly, it is effectively impossible to wind and unwind the screen A in the region having the width designated 1 shown in the drawings, i.e., in the region where the prime mover M and the flexible driving shaft F are disposed. Furthermore, in this conventional apparatus, since a reduction gear mechanism R is disposed between the prime mover M and the flexible driving shaft F and the load imposed on the pipe P is directly received by the flexible shaft F, when the winding width of the screen is large, it becomes necessary to provide a flexible driving shaft having an especially high strength, thereby resulting in the reduction of the flexibility of the flexible driving shaft thereby undesirably expanding the width 1.

SUMMARY OF THE INVENTION

Accordingly, one object of the present invention is to provide new and improved apparatus for opening and closing flexible screens in greenhouses or the like which overcome the drawbacks of the conventional apparatus described above.

Another main object of the present invention is to provide new and improved apparatus of the type described above wherein the flexible screen can be opened and closed in a smooth manner at any optional position in the greenhouse.

Briefly, in accordance with the present invention, these and other objects are attained by providing apparatus including an elongated driving shaft rotatably mounted about a fixed axis of rotation, drive apparatus for selectively rotating the driving shaft in either one of the normal and reversed directions, transmission gear apparatus operatively connected to the driving shaft, an elongated flexible driving shaft operatively connected at one end to the transmission gear means and which is adapted to be rotated through the transmission gear means upon the rotation of the driving shaft, reduction gear apparatus operatively connected to the other end of the elongated flexible driving shaft, and a winding rod operatively connected at one end to the reduction gear apparatus and adapted to be rotated through the reduction gear apparatus upon rotation of the flexible driving shaft.

According to the invention, the reduction gear apparatus is mounted for movement with respect to the greenhouse along guide apparatus according to the rotary motion of the winding rod. The guide apparatus prevents spontaneous rotation of the reduction gear means.

Connecting apparatus are provided for connecting one end of the flexible driving shaft to the output shaft of the transmission gear apparatus as well as for connecting the other end of the flexible driving shaft to the input of the reduction gear apparatus. Such connection apparatus allows for easy disconnection of the flexible driving shaft from the transmission and reduction gear apparatus.

In one embodiment, the apparatus for preventing spontaneous rotation of the reduction gear apparatus comprises a telescopic lever. In another embodiment, such apparatus is constituted by a guide rail and rollers adapted to ride thereon associated with the reduction gear apparatus.

A plurality of transmission gear apparatus can be mounted on the same driving shaft such that a pair of flexible driving shafts can be connected to a pair of output end portions of the output shafts thereof.

DESCRIPTION OF THE DRAWINGS

A more complete appreciation of the present invention and many of the attendant advantages thereof will be readily appreciated as the same becomes better understood by reference to the following detailed description when considered in connection with the accompany drawings in which:

FIGS. 2 through 8 illustrates a first embodiment of the apparatus of the present invention and, more particularly, FIG. 2 is a perspective view illustrating a greenhouse of the multiple-ridge type to which apparatus according to the present invention is applied;

FIG. 3 is a fragmentary perspective view illustrating a transmission gear apparatus;

FIG. 4 is a front view in partial section illustrating the assembled transmission gear apparatus illustrated in FIG. 3;

FIG. 5 is a side view in partial section of the transmission gear mechanism in assembled form as illustrated in FIG. 4;

FIG. 6 is a sectional view illustrating the connection between an output shaft of the transmission gear apparatus and a flexible driving shaft;

FIG. 7 is a front view in partial section of reduction gear apparatus;

FIG. 8 is a side view in partial section of the reduction gear apparatus illustrated in FIG. 7;

FIG. 10 is a side view in partial section illustrating another embodiment of the reduction gear apparatus for use in connection with the embodiment of the invention illustrated in FIG. 9.

DESCRIPTION OF THE PREFERRED EMBODIMENTS

Figure 1A:
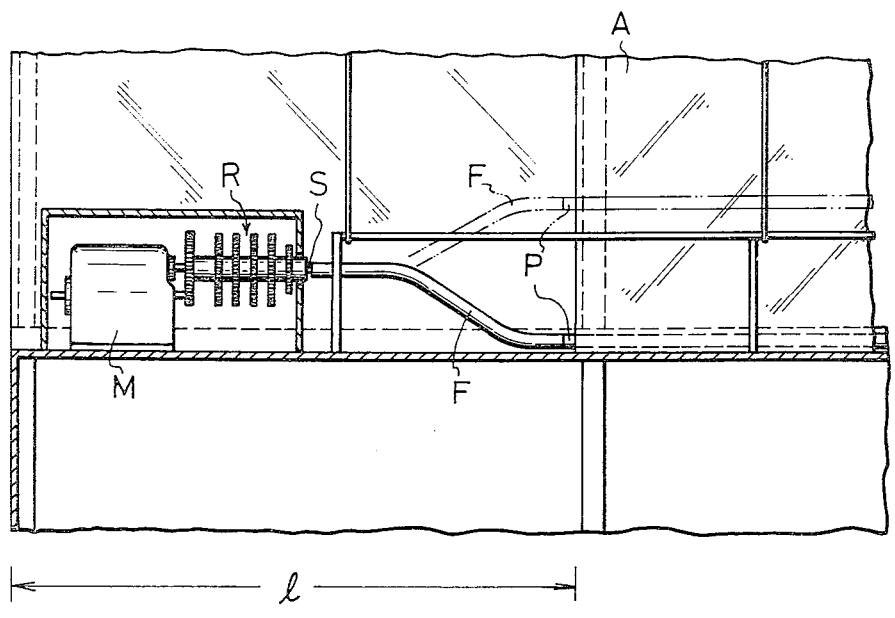
FIGS. 1a and 1b are sectional side and plan views, respectively, of conventional apparatus for opening and closing flexible screens in greenhouses or the like as discussed above.
Figure 1B:
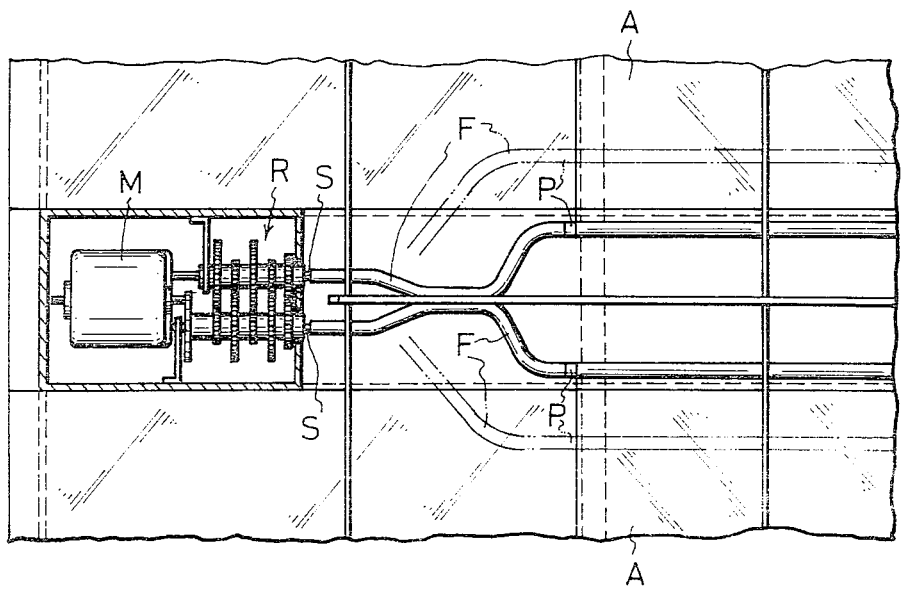
Figure 2:
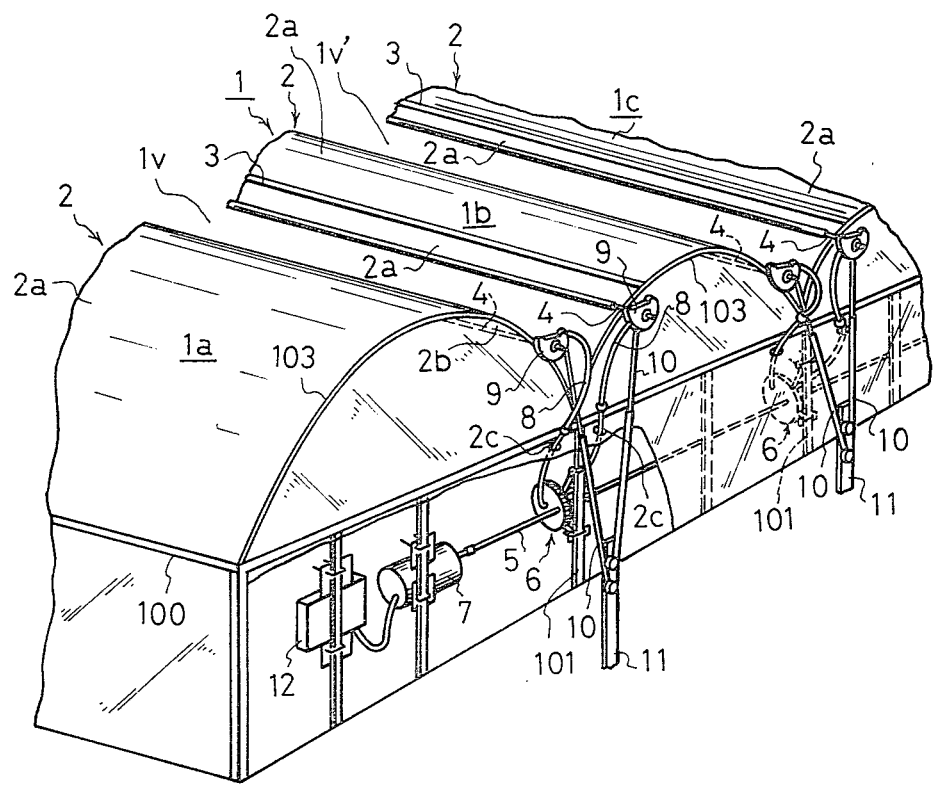

Referring now to the drawings wherein like reference characters designate identical or corresponding parts throughout the several views, and more particularly to FIG. 2, an embodiment of the apparatus of the present invention is illustrated which is arranged to open and close a flexible screen for covering the outer surface of a greenhouse of the multiple-ridge type. The greenhouse 1 comprises a plurality of ridges 1a, 1b and 1c consecutively arranged one after the other. Flexible screens 2 are opened and closed in trough portions 1v and 1v' defining the ridges 1a, 1b and 1c.

More particularly, each covering screen 2, 2 is separated or divided by a screen-fixing member 3, 3 extending between both of the gables of each of the ridges 1a, 1b and 1c in the vicinity of the top portion of the ridge into a stationary screen 2a and an openable and closable screen 2b. The stationary screen 2a extends between the screen-fixing members 3,3 or between the fixing member 3 and a side frame member 100 of greenhouse 1. The openable and closable screen 2b has one end edge fixed to the screen-fixing member 3 and the other end edge fixed to a winding rod 4. Accordingly, in this embodiment, the openable and closable screens 2b arranged in the troughs 1v and 1v' are wound or unwound through the rotation of the winding rod 4 whereby the troughs 1v and 1v' of the ceiling portion of the greenhouse 1 are opened or closed.

The driving mechanism for the winding rod 4 comprises a driving shaft 5 arranged along one gable wall of the greenhouse. The driving shaft 5 is rotatably mounted about a fixed axis and is supported by a plurality of transmission gear systems 6, 6 . . . , which are fixed to a frame 101 in the vicinity of the respective troughs 1v and 1v' of the ridges 1a, 1b and 1c of greenhouse 1. One end of the driving shaft 5 is operatively connected to a prime mover 7, such as a reversible motor, which is capable of rotation in both the normal and reverse directions.

One end of respective ones of elongated flexible driving shafts 8, 8, . . . , are operatively connected to the corresponding transmission gear systems 6,6, . . . , respectively, while the other ends of the flexible driving shafts 8, 8, . . . , are operatively connected to movable reduction gears 9 connected to one end of respective winding rods 4.

As seen in FIGS. 3 through 5, the transmission gear system 6 of the apparatus of the present invention comprises a cylindrical input shaft 61 having an inner diameter capable of receiving an end of the driving shaft 5 therewithin, an input gear 62 pivoted and fixed on the input shaft 61, an output gear 63 engaged with the input gear 62, an output shaft 64 to which the output gear 63 is fixed and a casing 65 rotatably housing and supporting the output shaft 64. The input shaft 61 is rotatably pivoted on a supporting hole 651 formed on the casing 65 through bearings 652, and the output shaft 64 is rotatably pivoted on a supporting hole 653 formed on the casing 65 through couplers 66 and bearings 654. A leg stand 67 is fixed to the casing 65 and fixing members 68, 68 are mounted on the top end of the leg stand 67 for attachment to the frame 101 of the greenhouse as seen in FIG. 2.

Figure 6:
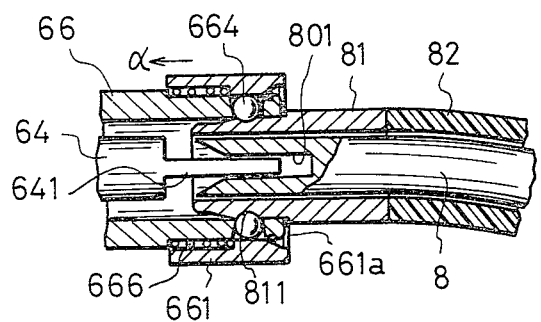

A concave annular groove or channel 663 in which a C-ring 662 for preventing separation of a sliding ring 661, described hereinbelow, is fitted. Holes 665 for the insertion of the balls 664 which prevent separation of a connection member 81 (FIG. 6) are formed on the top end portion of the coupler 66 fixed to the above-mentioned supporting hole 653. The sliding ring 661 has on the top end portion of the inner face thereof a tapered face 661a in which the inner diameter is increased toward the end edge, and the sliding ring 661 is fitted in the state where it is pressed against the top end side of the coupler 66 through a compression spring 666 as shown in FIGS. 5 and 6. Each of both the top end portions of the output shaft 64 is formed with projections 641, 641 which is formed so that the projections 641 is fitted in a groove 801 formed on an end portion of the flexible driving shaft 8.

Figure 7:
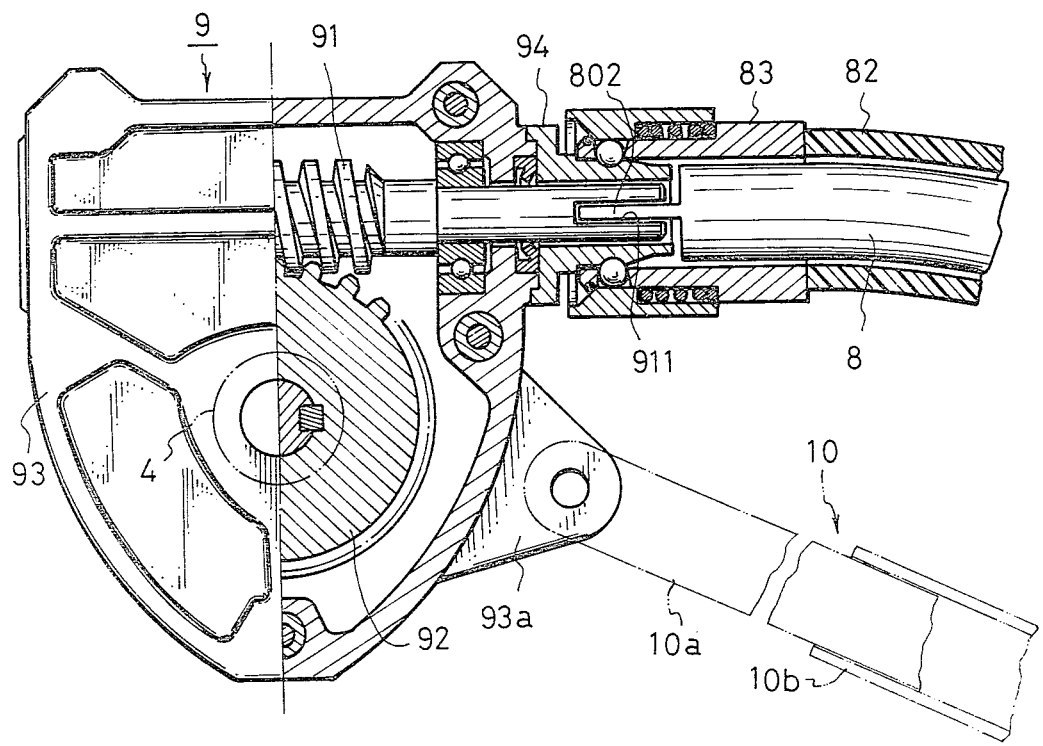

As shown in FIGS. 6 and 7, the flexible driving shaft 8 is rotatably and freely fitted in a flexible outer cylinder 82 and a groove 801 is formed in one end portion of the flexible driving shaft 8 so that the projection 641 of the output shaft 64 is receivable within the groove 801 and rotational torque of the output shaft 64 of the transmission gear apparatus 6 is transmitted to the flexible driving shaft 8. A projection 802 similar to that formed on the end portion of the output shaft 64 is formed on the other end portion of the flexible driving shaft 8. A connection member 81 as seen in A connection member 81 as seen in FIG. 6 is disposed on the end portion of the outer cylinder 82 in the region where the flexible driving shaft 8 is connected to the output shaft 64. A concave groove 811 is formed on the top end portion of the connection member so that the above-mentioned balls 664 are fitted in the groove 811, whereby the connection member 81 is prevented from separating from the coupler 66.

Referring to FIG. 6, the connection described above is seen in greater detail. Thus, when the connection member 81 is fitted in the coupler 66, the balls 664 are fitted in the concave groove 811 in a location where the balls 664 are pressed by the inner face of the sliding ring 661. At this point, the projection 641 of the output shaft 64 is fitted in the groove 801 of the flexible driving shaft 8. When it is desired to release this connection, the sliding ring 661 is slid in a direction indicated by the arrow a. When this occurs, the tapered face 661a of the sliding ring 661 is located over the balls 664 and the pressing action imposed on the balls 664 is released. Accordingly, if the connection member 81 is to be removed, the balls 664 fall out of the concave groove 811 with the result that the connection between the coupler 66 and the connection member 81 is released.

A coupler 83 similar to the coupler 66 is mounted on the other end portion of the outer cylinder 82.

Figure 8:
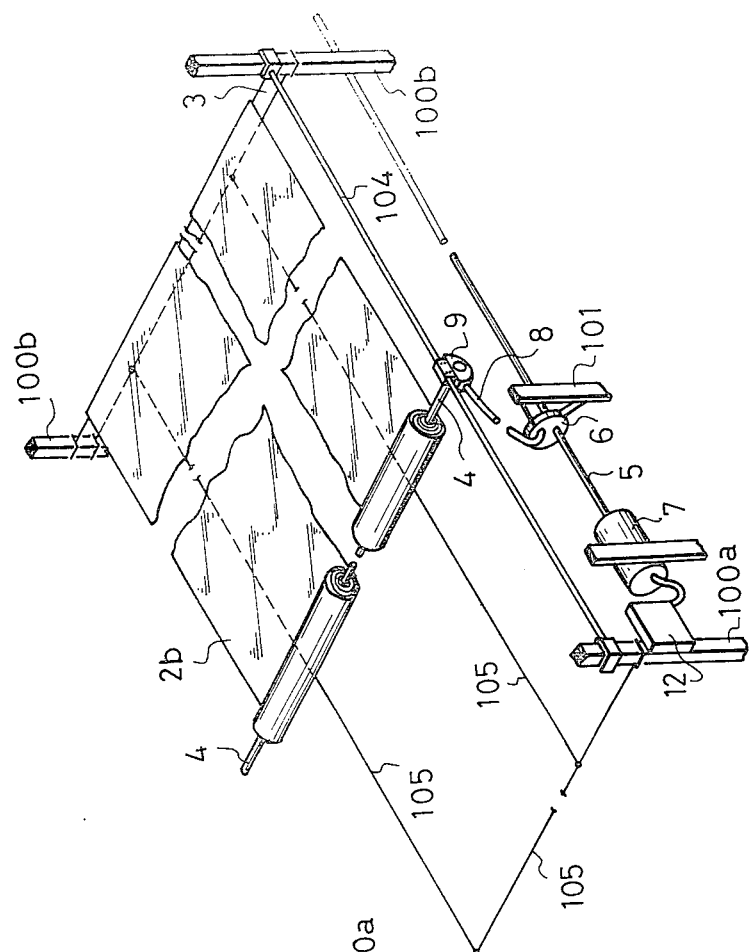

As more particularly shown in FIGS. 7 and 8, the movable reduction gear 9 comprises a worm 91. The rotation power is transmitted from the flexible driving shaft 8 and worm wheel 92 to which one end of the winding rod 4 is fixed, and which engages the worm 91. The worm 91 has a groove 911 formed on the input shaft end thereof, and the projection 802 of the flexible driving shaft 8 is fitted in the groove 911. The coupler 82 mounted on the outer cylinder 82 is connected to a connecting member 94 (similar to the connecting member 81 mounted on the outer cylinder 82) which is mounted on case 93 of the reduction gear 9. The rotation power of the flexible driving shaft 8 is accordingly reduced by the worm 91 and worm wheel 92 and transmitted to the winding rod 4.

In FIGS. 2 and 7, reference numeral 10 represents a telescopic lever which comprises a plurality of hollow cylindrical levers 10a, 10b, . . . , differing in their inner diameter, and arranged so that the lever 10 can be elongated and contracted by sliding movements of these hollow cylindrical levers 10a, 10b, . . . . The top end of the telescopic lever 10 is fixed to a flange portion 93a of casing 93, and a base end of the telescopic lever 10 is pivoted on a fixing member 11 disposed in the vicinity of the greenhouse 1. Thus, when the flexible screen 2b is wound and unwound, the winding rod 4 and reduction gear 9 can be shifted along the ceiling portion of the greenhouse 1, for example, an arcuate frame 103, and simultaneously, spontaneous rotation of the reduction gear 9 can be prevented.

In the structure of the above embodiment, the rotation power of the prime mover 7 is transmitted to the driving shaft 5 and also to the flexible driving shaft 8 connected to the output shafts 64 of the respective transmission gear systems 6, 6, and the winding rod 4 is rotated and moved through the reduction gear 9 to effect winding and unwinding of the flexible screen 2b.

Particularly in the embodiment of FIG. 2, the flexible shafts 8 are connected to both the ends of the output shafts 64 of the transmission gear systems 6, so that two winding rods 4,4 confronting each other in the troughs 1v and 1v' of the ridges 1a, 1b and 1c are rotated in directions reverse to each other to simultaneously open or close the flexible screens 2b confronting each other with the troughs 1v and 1v' of the ridges 1a, 1b and 1c being interposed therebetween.

It should be noted that in FIG. 2, reference numeral 12 represents a control panel for receiving signals transmitted from a temperature detector (not shown), a rain detector (not shown) and the like for performing such controls as normal rotation, reverse rotation and stopping of the prime mover according to the transmitted signals. Furthermore, reference numeral 2c represents a hole formed on the gable side wall of the greenhouse 1 and the flexible driving shaft 8 is inserted into this hole which acts to support the flexible driving shaft 8. In FIGS. 3 and 5, reference numeral 64a represents an oil seal, and reference numerals 65a and 65b represent bolt and nut assemblies, respectively.

A further embodiment of the invention which can be used to open and close a flexible screen for partitioning the interior of a greenhouse will be described below. In this embodiment, the same structural members as above are represented by the same reference numerals, and explanation of these members are therefore omitted.

Figure 9:
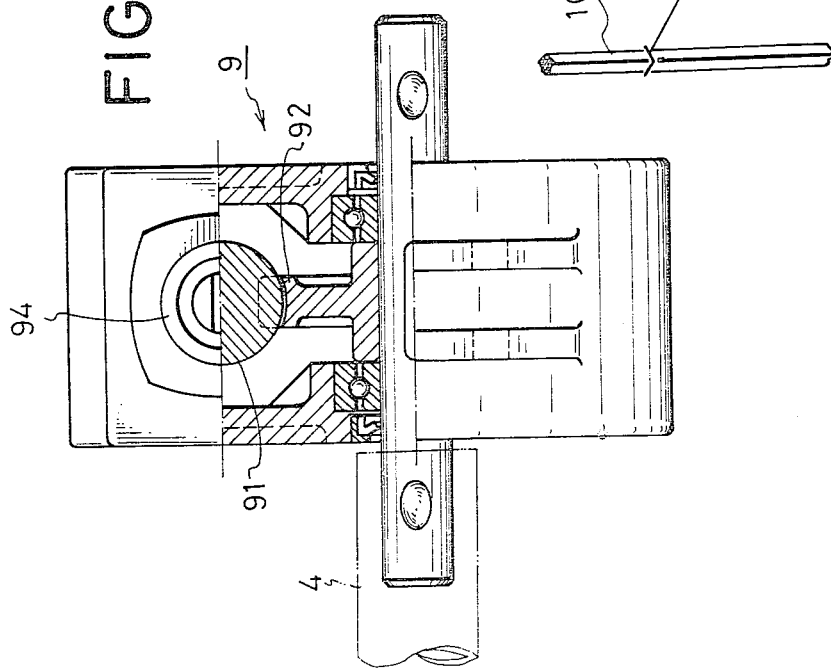
FIG. 9 is a perspective view illustrating a second embodiment of the apparatus of the present invention.

Referring to FIG. 9, a greenhouse 1 comprises main frames 100a and 100b which act as the framework of the greenhouse 1 where partitioning wires 105, 105 are spread at appropriate intervals for forming a partitioning plane by an openable and closable flexible screen 2b. As in the first embodiment of the invention, one edge end of the openable and closable screen 2b is fixed to a winding rod 4, and the other edge is fixed to a fixing member 3. In this condition, the winding rod 4 and screen 2b are placed on the partitioning wires 105, 105. Accordingly, the partitioning screen is opened and closed by the winding rod 4 which moves and rolls on the partitioning wires 105, 105 to wind and unwind the screen 2b.

As in the first embodiment, a driving shaft 5 driven by a motor 7 capable of rotation in both the normal and reverse directions is operatively connected to a transmission gear system 6 fixed and supported on frame 101, in this embodiment. One end of a flexible driving shaft 8 is operatively connected to the transmission gear system 6, and the other end of the flexible driving shaft 8 is operatively connected to a movable reduction gear 9 connected operatively to one end portion of the winding rod 4.

The rotation power of the motor 7 is transmitted to the movable reduction gear 9 and winding rod 4 through the transmission gear system 6 and flexible driving shaft 8. The reduction gear is supported by two pairs of rollers 9a (see FIG. 10), instead of the telescopic lever used in the first embodiment, so that the reduction gear 9 can be reciprocated between the frames 100a and 100b of the greenhouse 1 while spontaneous rotation of the reduction gear 9 along a guide rail 104 spread between the frames 100a and 100b is prevented.

The structure of the movable reduction gear 9 in this embodiment is illustrated in FIG. 10. This reduction gear 9 is different from the reduction gear of the first embodiment which is illustrated in FIG. 7 only by the fact that two pairs of rollers 9a for insertion of a guide rail 104 are disposed in the top end portion of the casing 93.

In the apparatus of the present invention having the above mentioned structure, the flexible screen can be opened and closed smoothly by movements of the movable reduction gear and winding rod. Since a plurality of winding rods can be rotated by a torque optionally taken out from one prime mover, even in the case of a greenhouse of the multiple-ridge type, it is not necessary to use a plurality of prime movers. Furthermore, since the transmission gear system has a structure in which the driving shaft is inserted into the input shaft and can be fixed in this inserted state at an optional position by means of screws 61a, the operations of adjusting the length of the driving shaft and cutting the driving shaft need not be performed. Furthermore, since the transmission gear system pivotally supports and driving shaft, any bearing member need not be particularly disposed. Still further, since the connecting portions of the flexible driving shafts have such structure that they are connected to one another, the length can optionally be adjusted by connection of flexible driving shafts having a unit length, which can be manufactured in large quantities very conveniently. Also, since the apparatus of the present invention is constructed so that the rotation power of the flexible driving shaft is transmitted to the winding rod through the reduction gear, the load imposed on the flexible driving shaft can be reduced, and therefore, it is not particularly necessary to use a flexible driving shaft having a high strength. As a consequence, manufacturing costs can be reduced.

Bayonet structures are adopted for connection of flexible driving shafts to transmission systems and reduction gears and for connection of driving shafts to one another. Consequently, connecting and disconnecting operations can be easily performed.

The latter described embodiment is suitable for a greenhouse of the multiple-ridge type. However, as will be apparent to those skilled in the art, this embodiment can also be applied to a single-ridge greenhouse and used for opening and closing screens not only in the ceiling portion but also in the side wall portion.

What is claimed is:

1. In apparatus for opening and closing a flexible screen of a greenhouse or the like of the type wherein a rotatable winding rod is fixed by one end edge of the flexible screen and wherein the screen is opened or closed by rotating the winding rod in a normal or reverse direction, respectively, the improvement comprising:

an elongated driving shaft rotatably mounted about a fixed axis of rotation;

drive means for selectively rotating said driving shaft in either one of the normal and reverse directions;

transmission gear means operatively connected to said driving shaft;

an elongated flexible driving shaft operatively connected at one end to said transmission gear means and adapted to be rotated through said transmission gear means upon the rotation of said driving shaft;

reduction gear means operatively connected to the other end of said elongated flexible driving shaft, said reduction gear means being mounted for movement with respect to said greenhouse;

a winding rod operatively connected at one end to said reduction gear means and which is fixed to one end edge of the flexible screen adapted to be rotated through said reduction gear means upon rotation of said flexible driving shaft; and means for guiding the movement of said reduction gear means with respect to said greenhouse according to the rotary motion of said winding rod and for preventing spontaneous rotation of said reduction gear means.

2. The combination of claim 1 wherein said transmission gear means comprise a casing, a cylindrical input shaft adapted to receive said elongated driving shaft, said input shaft being rotatably supported in the casing, an input gear fixed to said input shaft, an output gear in engagement with the said input gear, and an output shaft to which said output gear is fixed, said output shaft being rotatably supported in said casing.

3. The combination of claim 2 wherein said reduction gear means comprise a worm and a worm gear in engagement therewith.

4. The combination of claim 3 wherein said output shaft of said transmission gear means is connected to one end of the flexible driving shaft through connecting means.

5. The combination of claim 3 wherein the other end of the flexible driving shaft is connected through the worm of the reduction gear means through connecting means.

6. The combination of claim 4 wherein said connecting means comprise a connection member having recesses formed therein fixed to an end of said flexible shaft, a coupler associated with said transmission means having an annular channel formed therein adapted to align with said recesses, a plurality of balls situated in said aligned recesses and channel and a ring slidably fitted over said coupler for maintaining the location of said balls in said aligned recesses and channel to prevent said connection member from separating from said coupler and spring means for biasing said ring into said position.

7. The combination of claim 5 wherein said connecting means comprises a connection member having recesses formed therein fixed to said gear reduction means, a coupler fixed to an end of said flexible shaft having an annular channel formed therein adapted to align with said recesses, a plurality of balls situated in said aligned recesses and channel and a ring slidably fitted over said coupler for maintaining the location of said balls in said aligned recesses and channel to prevent said connection member from separating from said coupler and spring means for biasing said ring into said position.

8. The combination of claim 3 wherein said means for preventing spontaneous rotation of said reduction gear means comprise a telescopic lever formed of a plurality of telescoping cylinders differing in diameter from each other.

9. The combination of claim 3 wherein said means for preventing spontaneous rotation of said reduction gear means comprise a guide rail and roller means associated with said reduction gear means adapted to ride on said guide rail.

10. The combination of claim 2 wherein a plurality of transmission gear means are mounted on said elongated driving shaft and wherein said output shafts of said transmission gear means each have two output end portions, and wherein respective ends of a pair of respective flexible driving shafts are operatively connected to respective ones of the output end portions of the output shafts of a corresponding transmission gear means.

* * * * *